United States Patent
Krishna et al.

(10) Patent No.: US 12,505,154 B1
(45) Date of Patent: Dec. 23, 2025

(54) DATA STORAGE DEVICE AND METHOD FOR VIDEO FRAME LINK-BASED MANAGEMENT AND PROCESSING

(71) Applicant: Sandisk Technologies, Inc., Milpitas, CA (US)

(72) Inventors: Dharmaraju Marenahally Krishna, Bengaluru (IN); Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/810,720

(22) Filed: Aug. 21, 2024

(51) Int. Cl.
  *G06F 16/00* (2019.01)
  *G06F 16/41* (2019.01)
  *G06F 16/48* (2019.01)

(52) U.S. Cl.
  CPC .............. *G06F 16/48* (2019.01); *G06F 16/41* (2019.01)

(58) Field of Classification Search
  CPC ....................................................... G06F 16/41
  See application file for complete search history.

(56) References Cited

U.S. PATENT DOCUMENTS

| | | | |
|---|---|---|---|
| 7,020,351 B1 | 3/2006 | Kumar et al. | |
| 9,036,977 B2 | 5/2015 | Patten et al. | |
| 9,251,503 B2 | 2/2016 | Sharma et al. | |
| 9,600,483 B2* | 3/2017 | Lindley | G06F 16/5866 |
| 10,841,645 B1 | 11/2020 | Muthiah | |
| 10,897,658 B1 | 1/2021 | Sethu et al. | |
| 2011/0033115 A1 | 2/2011 | Shiraishi et al. | |
| 2025/0104380 A1* | 3/2025 | Matusek | G06F 3/0484 |

* cited by examiner

*Primary Examiner* — Cheryl Lewis
(74) *Attorney, Agent, or Firm* — Crowell & Moring LLP

(57) ABSTRACT

A data storage device and method are disclosed for video frame link-based management and processing. In one embodiment, the data storage devices' one or more processors, individually or in combination, are configured to: receive, from a host, a plurality of image frames, at least some of which have been tagged by the host; store the plurality of image frames in the memory; create a data structure that identifies locations in the memory that store the image frames that have been tagged by the host; receive, from the host, a request to perform an operation on the image frames that have been tagged by the host; use the data structure to retrieve, from the memory, the image frames that have been tagged by the host; and perform the operation on the image frames that have been tagged by the host. Other embodiments are provided.

17 Claims, 9 Drawing Sheets

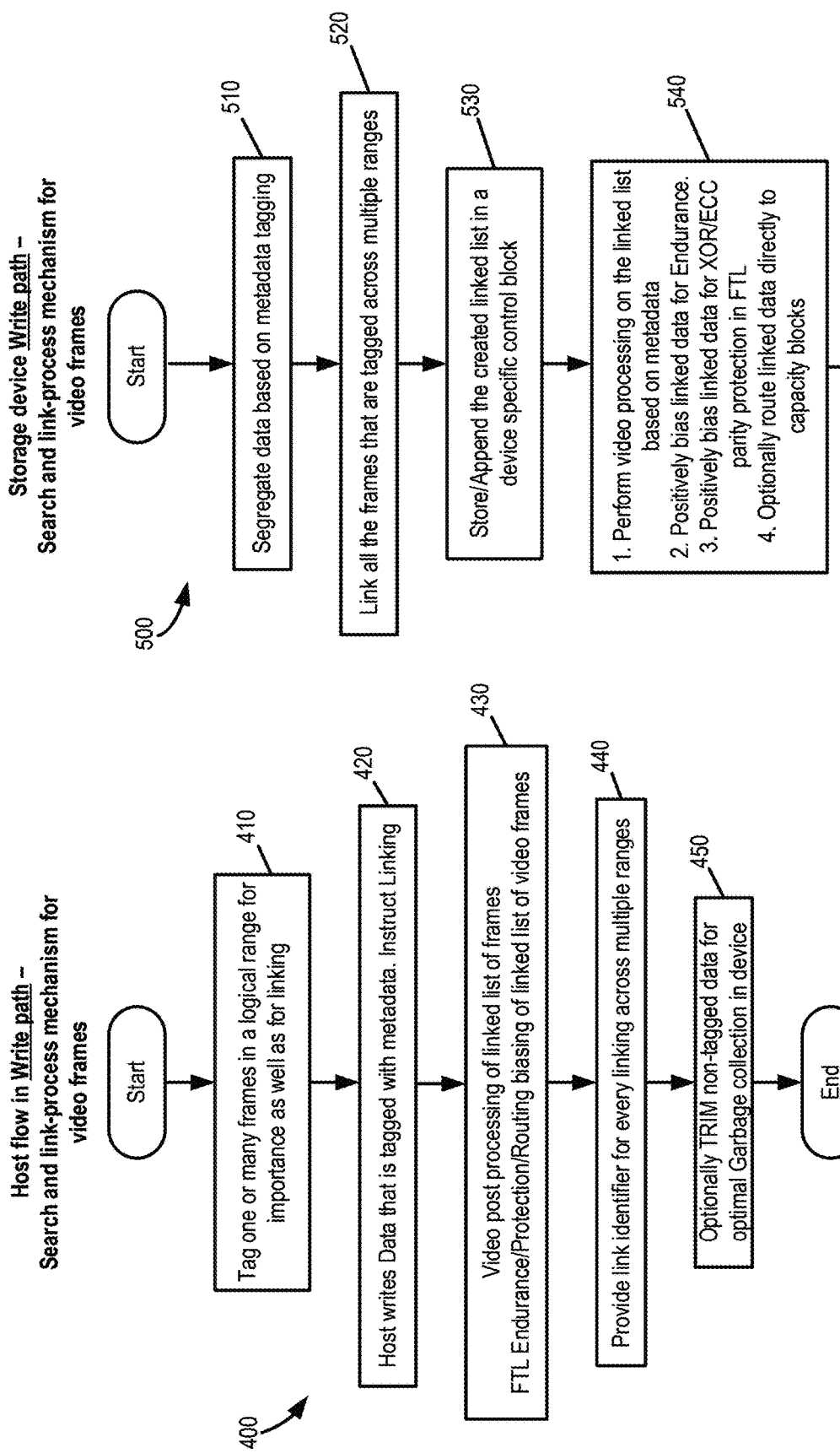

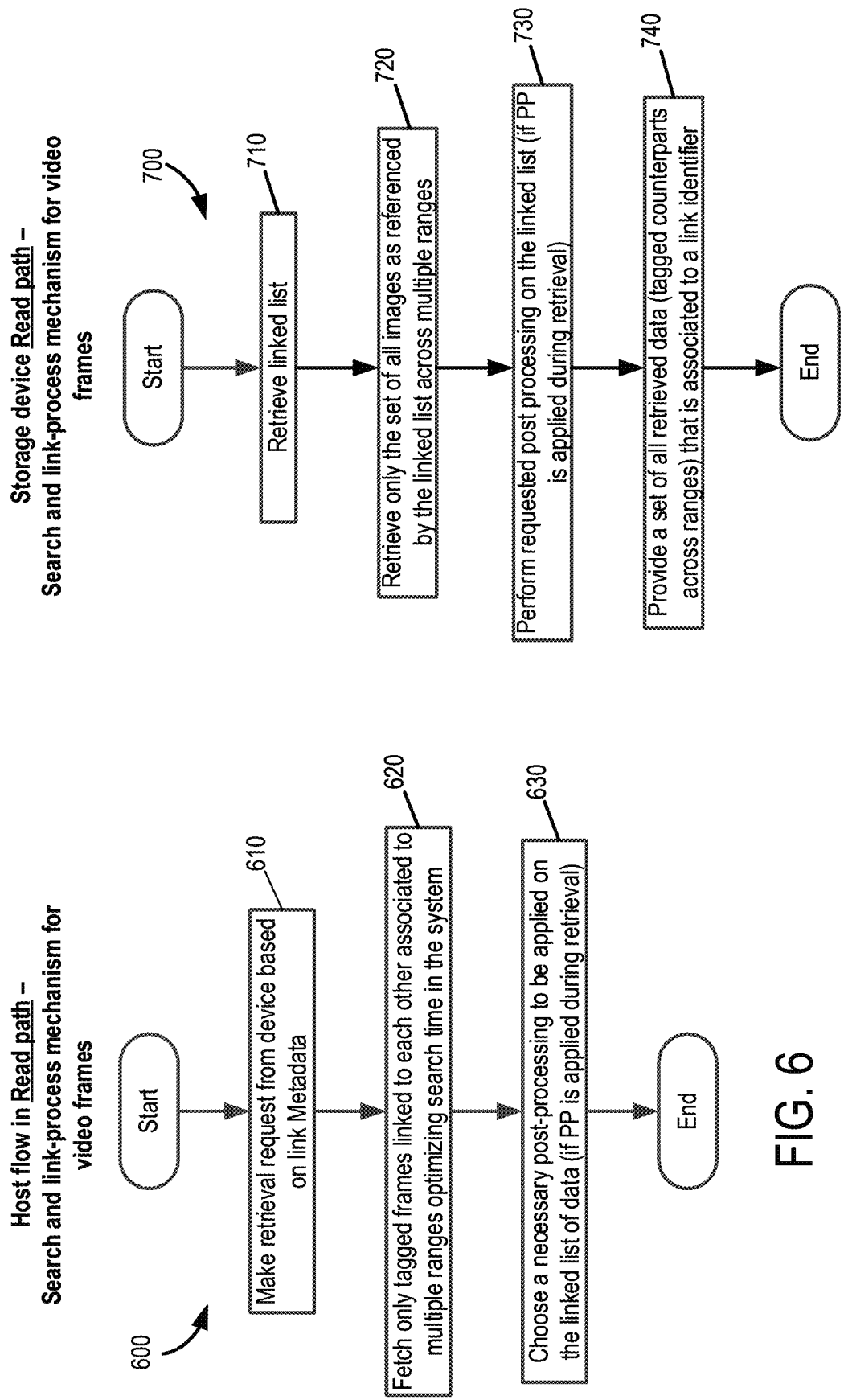

DATA STORAGE DEVICE AND METHOD FOR VIDEO FRAME LINK-BASED MANAGEMENT AND PROCESSING

BACKGROUND

With the relatively-large storage capacity of modern data storage devices, a user may not worry about memory space and endurance when using a data storage device to store photos or videos. As a result, a user may store multiple copies of the same photo/video or multiple photos/videos from the same event. The user can manually note the best photo/video for later use. For example, during a film shoot, there can be multiple shots taken, and the photographer can note the best shot(s) for later use. During editing, the photographer can manually sort through the shots to find the one(s) he previously noted. Given the relatively-large capacity of a data storage device used with the camera, the photographer may have many terabytes' worth of shots to sort through, which can be a very time-consuming and tedious process. A similar situation can occur when an ordinary user takes multiple photos on a trip and later tries to find a particular photo among the potentially thousands of photos/videos stored on the user's data storage device. To assist in this process, some camera-equipped mobile devices can provide dates and places of the photos/videos as a sorting mechanism.

BRIEF DESCRIPTION OF THE DRAWINGS

FIG. 4 is a flow chart of a host write path of an embodiment.

FIG. 5 is a flow chart of a data storage device write path of an embodiment.

FIG. 6 is a flow chart of a host read path of an embodiment.

FIG. 7 is a flow chart of a data storage device read path of an embodiment.

DETAILED DESCRIPTION

Figure 1A:
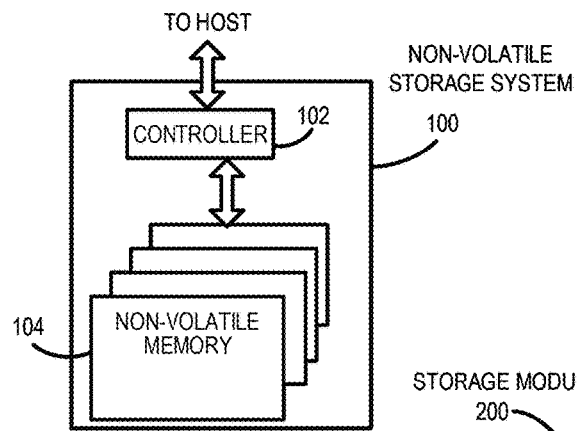
FIG. 1A is a block diagram of a data storage device of an embodiment.

The following embodiments generally relate to a data storage device and method for video frame link-based management and processing. In one embodiment, a data storage device is provided comprising a memory and one or more processors. The one or more processors, individually or in combination, are configured to: receive, from a host, a plurality of image frames, at least some of which have been tagged by the host; store the plurality of image frames in the memory; create a data structure that identifies locations in the memory that store the image frames that have been tagged by the host; receive, from the host, a request to perform an operation on the image frames that have been tagged by the host; use the data structure to retrieve, from the memory, the image frames that have been tagged by the host; and perform the operation on the image frames that have been tagged by the host.

In some embodiments, the one or more processors, individually or in combination, are further configured to store the image frames that have been tagged by the host in blocks of the memory than have a relatively-higher endurance than blocks that store image frames that have not been tagged by the host.

In some embodiments, the one or more processors, individually or in combination, are further configured to store the image frames that have been tagged by the host in blocks of the memory than have relatively-greater data protection than blocks that store image frames that have not been tagged by the host.

In some embodiments, the one or more processors, individually or in combination, are further configured to route the image frames that have been tagged by the host to relatively higher-capacity blocks of the memory than blocks that store image frames that have not been tagged by the host.

In some embodiments, the one or more processors, individually or in combination, are further configured to prioritize garbage collection of blocks of the memory that store image frames that have been tagged by the host over blocks of the memory that store image frames that have not been tagged by the host.

In some embodiments, the one or more processors, individually or in combination, are further configured to store the data structure in a control block in the memory.

In some embodiments, the data structure comprises a linked list.

In some embodiments, the image frames that have been tagged by the host are tagged with metadata.

In some embodiments, the one or more processors, individually or in combination, are further configured to segregate the image frames that have been tagged by the host from image frames that have been not tagged by the host.

In some embodiments, the one or more processors, individually or in combination, are further configured to use the data structure in a read look-ahead process.

In some embodiments, the one or more processors, individually or in combination, are further configured to predict invalidation of image frames that have not been tagged by the host.

In some embodiments, the memory comprises a three-dimensional memory.

In another embodiment, a method is provided that is performed in a data storage device comprising a memory. The method comprises: storing, in the memory, a plurality of image frames received from a host, wherein some, but not all, of the plurality of image frames are associated with a metadata tag; creating a data structure that identifies locations in the memory that store the image frames that are associated with the metadata tag; receiving, from the host, a request to perform a video processing operation on the image frames that are associated with the metadata tag; using the data structure to retrieve, from the memory, the image frames that are associated with the metadata tag; and performing the video processing operation on the image frames that are associated with the metadata tag.

In some embodiments, the method further comprises storing the image frames that are associated with the metadata tag in areas of the memory than have a relatively-higher endurance than areas of the memory that store image frames that are not associated with the metadata tag.

In some embodiments, the method further comprises storing the image frames that are associated with the metadata tag in areas of the memory with relatively-greater data protection than areas of the memory that store image frames that are not associated with the metadata tag.

In some embodiments, the method further comprises routing the image frames that are associated with the metadata tag to relatively higher-capacity areas of the memory than areas of the memory that store image frames that are not associated with the metadata tag.

In some embodiments, the method further comprises prioritizing garbage collection of areas of the memory that store image frames that are associated with the metadata tag over areas of the memory that store image frames that are not associated with the metadata tag.

In some embodiments, the method further comprises storing the data structure in a control block in the memory.

In some embodiments, the data structure comprises a linked list.

In yet another embodiment, a data storage device is provided comprising: a memory; and means for: creating a data structure that identifies locations in the memory that store image frames that are associated with a tag generated by a host; receiving, from the host, a request to perform an operation on the image frames that are associated with the tag; using the data structure to retrieve, from the memory, the image frames that are associated with the tag; and performing the operation on the image frames that are associated with the tag.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1B:
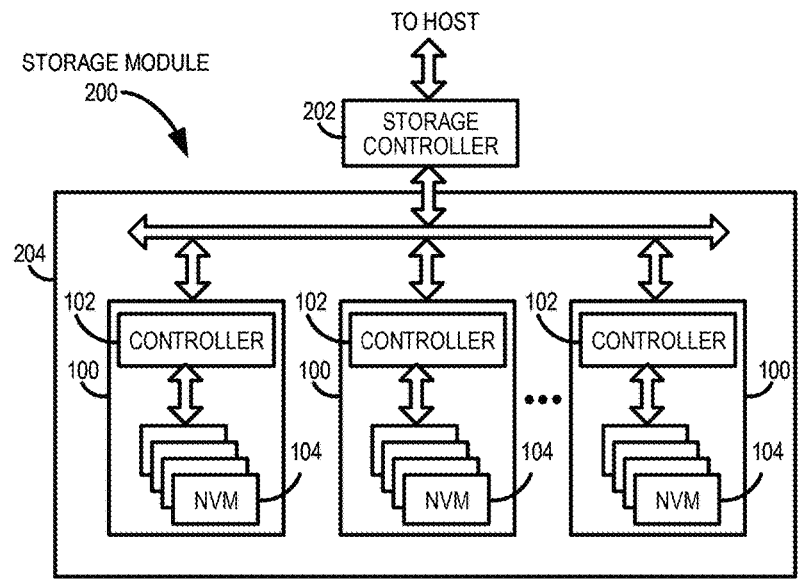
FIG. 1B is a block diagram illustrating a storage module of an embodiment.
Figure 1C:
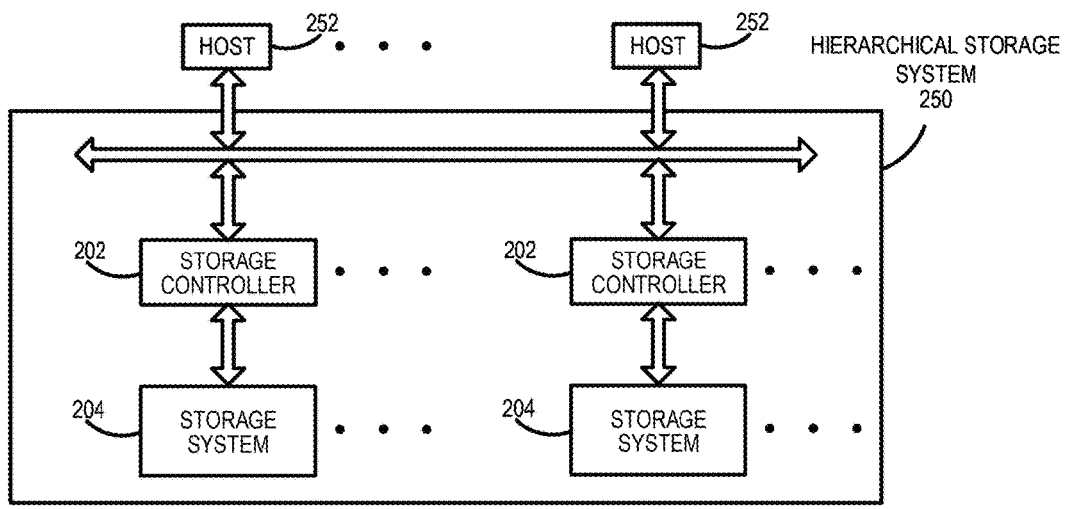
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
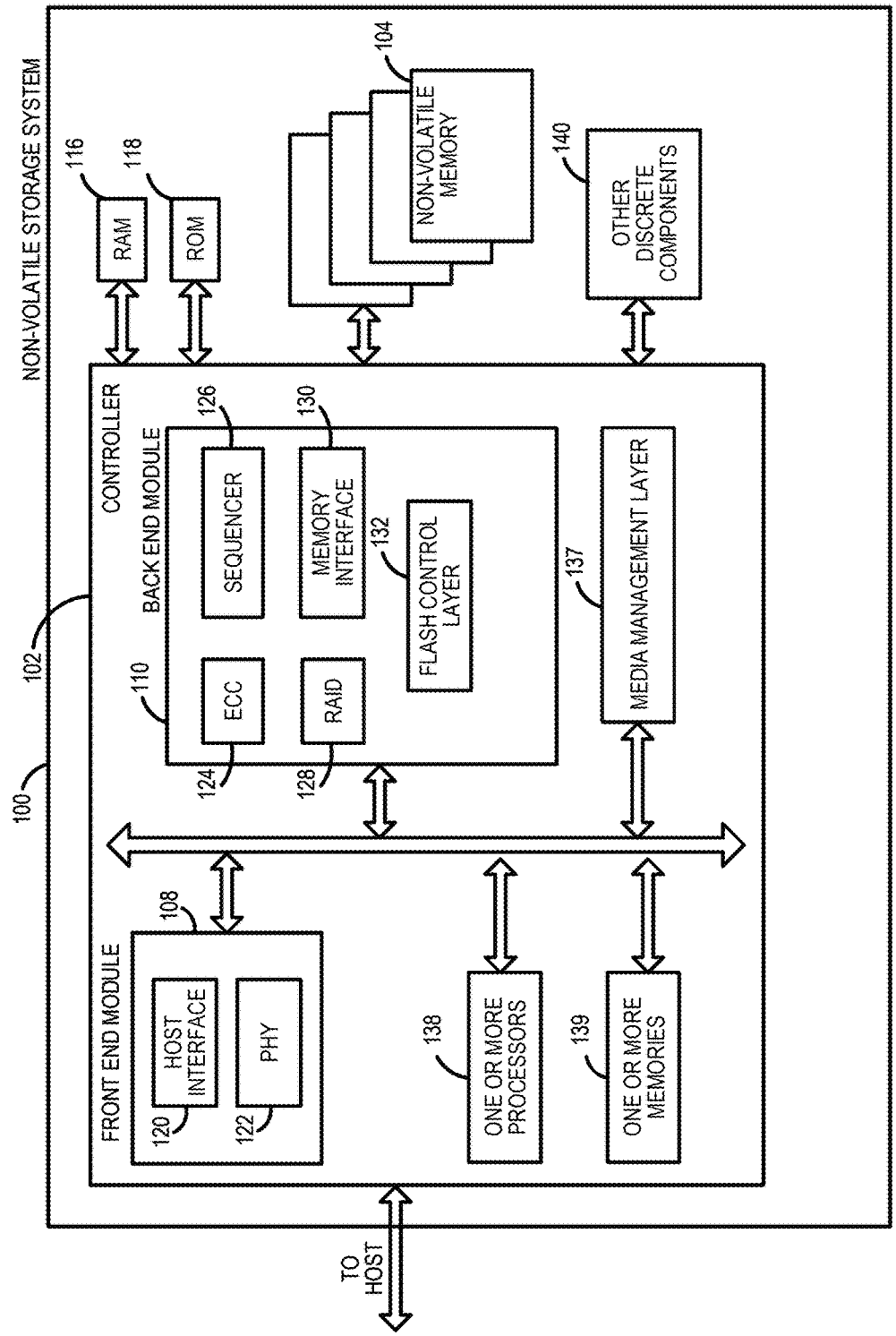
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
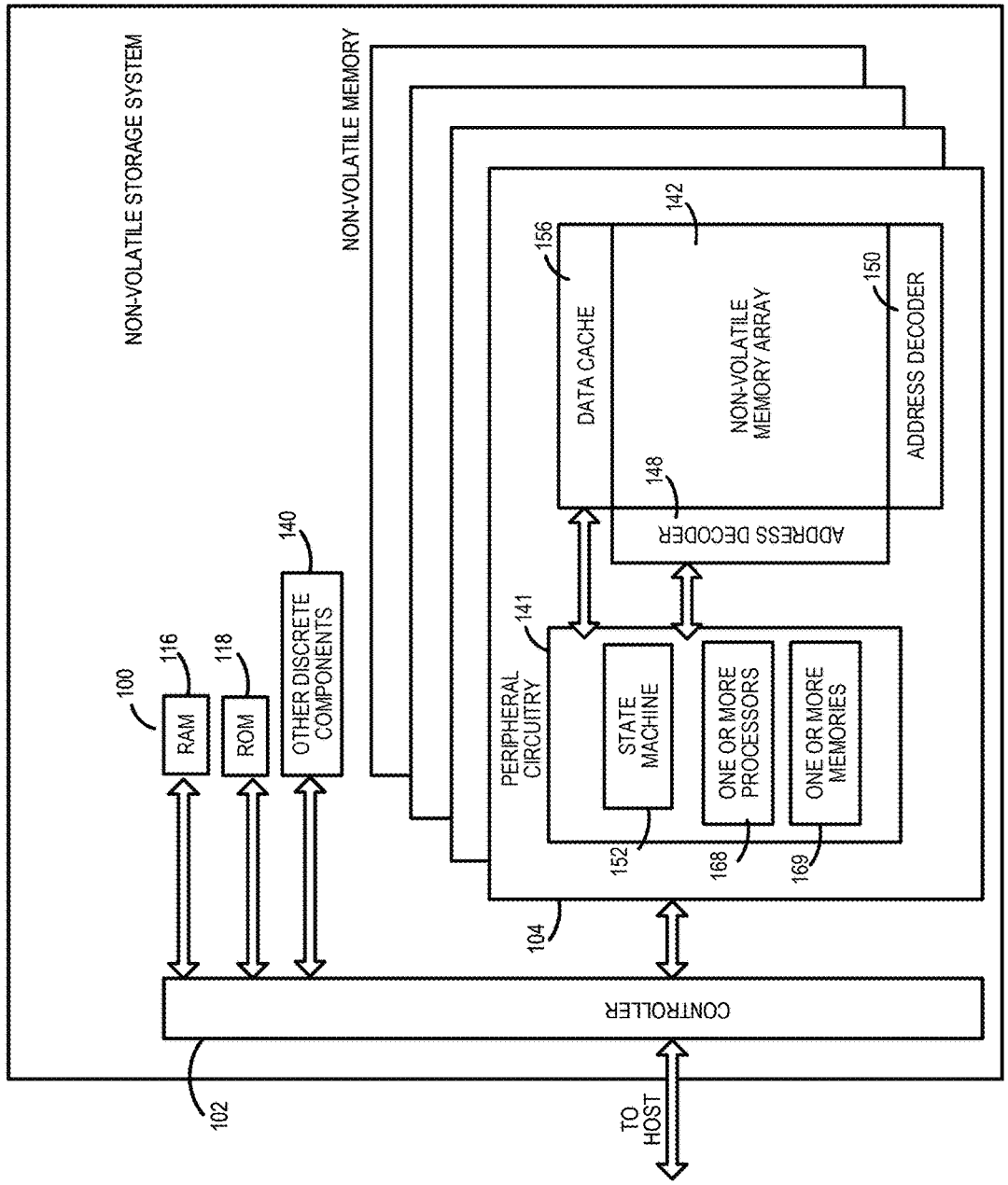
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components)

can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
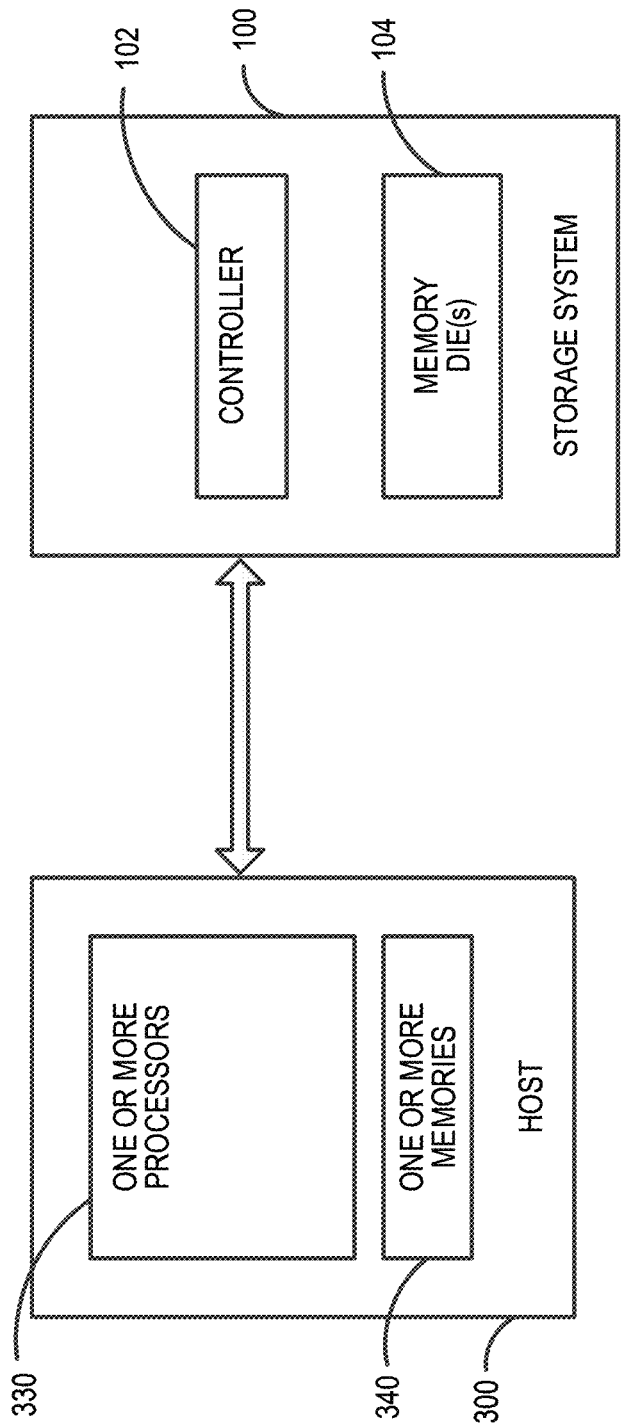
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, with the relatively-large storage capacity of modern data storage devices, a user may not worry about memory space and endurance when using a data storage device to store photos or videos. As a result, a user may store multiple copies of the same photo/video or multiple photos/videos from the same event. The user can manually note the best photo/video for later use. For example, during a film shoot, there can be multiple shots taken, and the photographer can note the best shot(s) for later use. During editing, the photographer can manually sort through the shots to find the one(s) he previously noted. Given the relatively-large capacity of a data storage device used with the camera, the photographer may have many terabytes' worth of shots to sort through, which can be a very time-consuming and tedious process. A similar situation can occur when an ordinary user takes multiple photos on a trip and later tries to find a particular photo among the potentially thousands of photos/videos stored on the user's data storage device. To assist in this process, some camera-equipped mobile devices can provide dates and places of the photos/videos as a sorting mechanism.

The following embodiments can be used to address this problem. In one embodiment, the host 300 creates a link of image frames by tagging metadata on determined images across different logical regions such that it can request specific video post-processing on the linked-list with optional flash translation layer (FTL)-biased protection/ endurance on the linked list of frames. (As used herein, an "image frame" can refer to a single image (e.g., a photo) or a frame from a plurality of frames of a video.) The controller 102 of the data storage device 100 can be configured to segregate video frames that needs to be linked and manage a data structure towards flash endurance, FTL parity biasing, and routing decision, and can perform video post-processing on the list of video frames associated with the link. This can enable an efficient link-identifier-based data search, processing, and retrieval mechanism in the data storage device 100.

In one embodiment, the controller 102 can use the created linked list to determine the next set of read accesses for read-look-ahead (RLA) purposes of the logical data, wherein the controller 102 parses the linked list and fetches the set of relevant video frames in a range (as referenced by the linked list) even before the host 300 issues the request in a logical block address (LBA)-based retrieval system. Additionally, the controller 102 can use the link information to speculate data invalidation owing to futuristic trim of untagged data from the host 300. In turn, based on that speculation, the controller 102 can delay garbage collection (GC) on specific blocks in the memory 104 (e.g., metablocks formed from blocks across a plurality of memory dies) when the controller 102 determines the presence of non-tagged logical data in multiple ranges in that block. If the data is anticipated to get invalidated, the controller 102 can avoid garbage collection on those blocks since the efficiency is less when the data is moved and gets invalidated shortly. Thus, the controller 102 can use the linked list to optimize its FTL workload.

In another embodiment where a multi-client system is used, the controller 102 of the data storage device 100 may additionally fuse images from multiple hosts, if the metadata that is tagged to the video frames for linking matches between the hosts, in which case, the linked list comprises references to the video frames with a metadata identifier. In this case, the link comprises video-frame candidates associated with multiple host systems irrespective of the logical region, thereby bringing them under a common umbrella for the purposes of video-processing, independent of the host system and just based on the metadata. In yet another embodiment, the frames can be based on the type of video frame (e.g., an intra-frame (I frame) or an inter-frame (non-I frame)) or any specific other property, such as, but not limited to, a video codec type associated with the data set.

The controller 102 of the data storage device 100 can optionally be configured to perform video post processing only on the linked frames and not process untagged images, thereby saving considerable resources. For example, the controller 102 can perform image enhancement, such as sharpening of the linked images on the set of video frames connected by the linked list during a retrieval request of a link.

These embodiments can be implemented in any suitable way. The following paragraphs provide example implementations that can be used. It should be noted that these are merely examples and that other implementations can be used.

In one example, the host 300 tags some video frames with linked metadata prior to storage that it determines to be most important in a logical range (e.g., an image in a video) and further instruct the data storage device 100 to link those tagged video frames across multiple logical ranges to create a linked list of all the images and optionally bias such specific frames for better endurance and parity protection in the memory 104. In this example, the host 300 makes a retrieval request based on a retrieval identifier, wherein the metadata is passed to have access to the set of all linked images (e.g., all useful video frames in one or many logical regions). The host 300 and/or data storage device 100 can manage multiple linked lists for multiple logical ranges and use that list for a different retrieval mechanism other than the typical LBA-based retrieval. The host 300 may also follow up with deallocation of the rest of the video frames (untagged images) in the multiple regions that were not selected by the host driver or the end-user, thereby enabling the device to optimize background operation.

FIG. 4 is a flow chart 400 of a method of an embodiment for host flow in a write path. As shown in FIG. 4, the host 300 tags one or many frames in a logical range for importance as well as linking (410). The host 300 then writes data that is tagged with metadata and instructs linking (420). Next, the host 300 performs video post processing of a linked list of frames, with FTL endurance/protection/routing biasing of the linked list of video frames (430). The host 300 provides the link identifier for every linking across multiple ranges (440), and the host 300 optionally trims non-tagged data for optimal garbage collection in the data storage device 100 (450).

FIG. 5 is a flow chart 500 of a method of an embodiment for data storage device flow in a write path. As shown in FIG. 5, the controller 102 of the data storage device 100 segregates data based on metadata tagging (510). The controller 102 then links all the frames that are tagged across multiple ranges (520). Next, the controller 102 stores/appends the created linked list in a device-specific control block (530). Finally, the controller 102 performs video processing on the linked list based on metadata, positively biasing the linked data for endurance and XOR/ECC parity protection, and optionally routes the linked data directly to capacity blocks (540).

In one example, the controller 102 of the data storage device 100 segregates the image(s) (e.g., specific one or many video frames) from the logical range that is tagged with link metadata, repeats the steps for multiple ranges, links those images, and maintains a linked list at a logical range level. The controller 102 can optionally bias with higher endurance storage, high parity protection of the linked video frames and additionally store those linked video frames directly in capacity storage blocks. The controller 102 can also manage separate blocks for the tagged video frames. That is, once the metadata-based segregation is completed, the controller 102 can have a special routing policy that includes different destination blocks and a different exclusive-or (XOR)/error correction code (ECC) parity protection for the tagged images from each of the logical ranges. The controller 102 can store the tagged linked list that it created in a device-specific control block. When the host 300 requests to retrieve the data based on the tagging, the controller 102 can use the stored linked list to fetch the set of all the images linked by the list and present them to the host 300 based on a predetermined retrieval/link identifier.

FIG. 6 is a flow chart 600 of a method of an embodiment for host flow in a read path. As shown in FIG. 6, the host 300 makes a retrieval request to the data storage device 100 based on the linked metadata (610). The host 300 then fetches only the tagged frames linked to each other that are associated with associated ranges, which optimizes search time in the system (620). Then, the host 300 chooses a necessary post-processing to be applied on the linked list of data, if post-processing is applied during retrieval) (630).

FIG. 7 is a flow chart 700 of a method of an embodiment for data storage device flow in a read path. As shown in FIG. 7, the controller 102 of the data storage device 100 retrieves the linked list (710). The controller 102 retrieves only the set of all images as references by the linked list across multiple ranges (720). Next, the controller 102 performs required post-processing on the linked list (if post-processing is applied during retrieval) (730). Finally, the controller 102 provides a set of all retrieved data (tagged counterparts across ranges) that is associated with a link identifier (740).

In another example, the system can be used to implement an efficient playlist as well, wherein when the favorites are added, the link table is updated with the corresponding logical data of the next reference. The host 300 can simply use the retrieval identifier to fetch the set of all the video or the media data.

Figure 8:
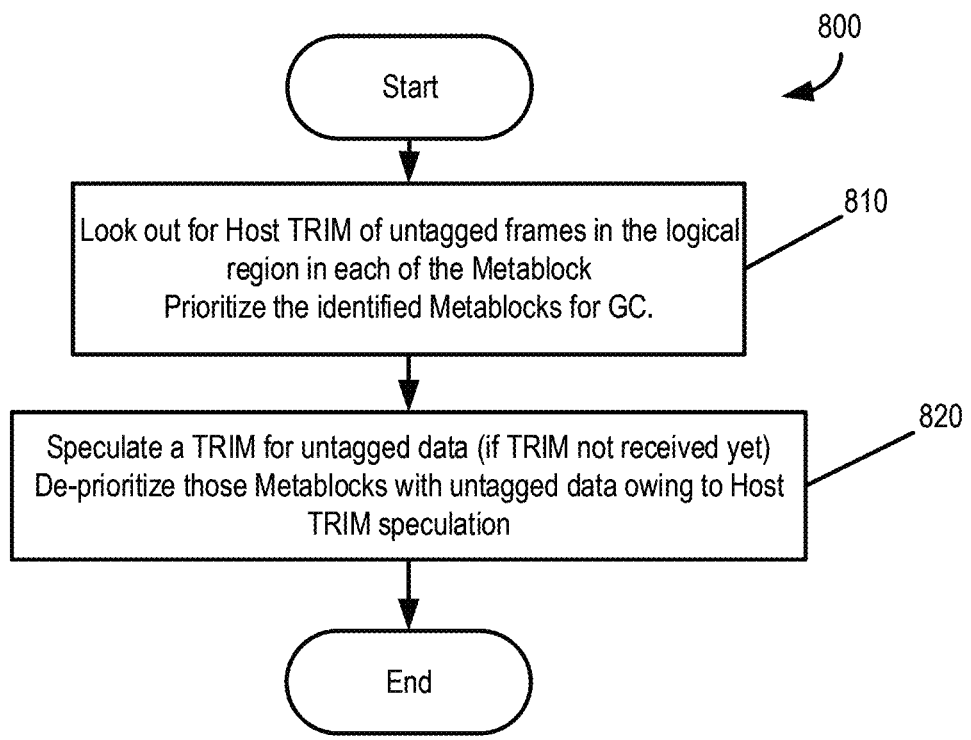
FIG. 8 is a flow chart of a data storage device garbage collection path of an embodiment.

FIG. 8 is a flow chart 800 of a method of an embodiment for a data storage device flow in a garbage collection path. As shown in FIG. 8, the controller 102 of the data storage device 100 looks out for a host trim of untagged frames in the logical region in each of the metablocks and prioritizes the identified metablocks for garbage collection (810). The controller 102 then speculates a trim for untagged data (if the trim is not received yet) and de-prioritizes those metablocks with untagged data owing to host trim speculation (820).

In one example implementation, a vendor-specific command is used to get the right copy of the image and/or video to have smart list for hash tagging the content without creating separate back-up copy. For example, when a photo/video is captured, the user may know which copy is better while reviewing at that instance. The user can select the copy and mark it as a favorite. The host (e.g., camera/phone) 300 can send a vendor-specific command to the data storage device 100 with the LBA and its range of corresponding image/video. The controller 102 of the data storage device 100 can identify the command and store its meta information in a separate location. When it comes to editing or sharing the only the best copies, the user can get the favorites from the host 300. The host 300 can send the list of favorites in a single or multiple vendor-specific commands to the data storage device 100. The controller 102 of the data storage device 100 can decode the command and send only the corresponding LBA's of image or video back to the host 300. To delete the unwanted photos, a similar methodology using a vendor-specific command can be used. Based on a defragment command, the controller 102 of the data storage device 100 can internally clean-up all the LBAs except the favorites, which is faster than a regular defragment operation. This helps avoid manual intervention for searching, storing, reading, defragmenting, etc.

Figure 9:
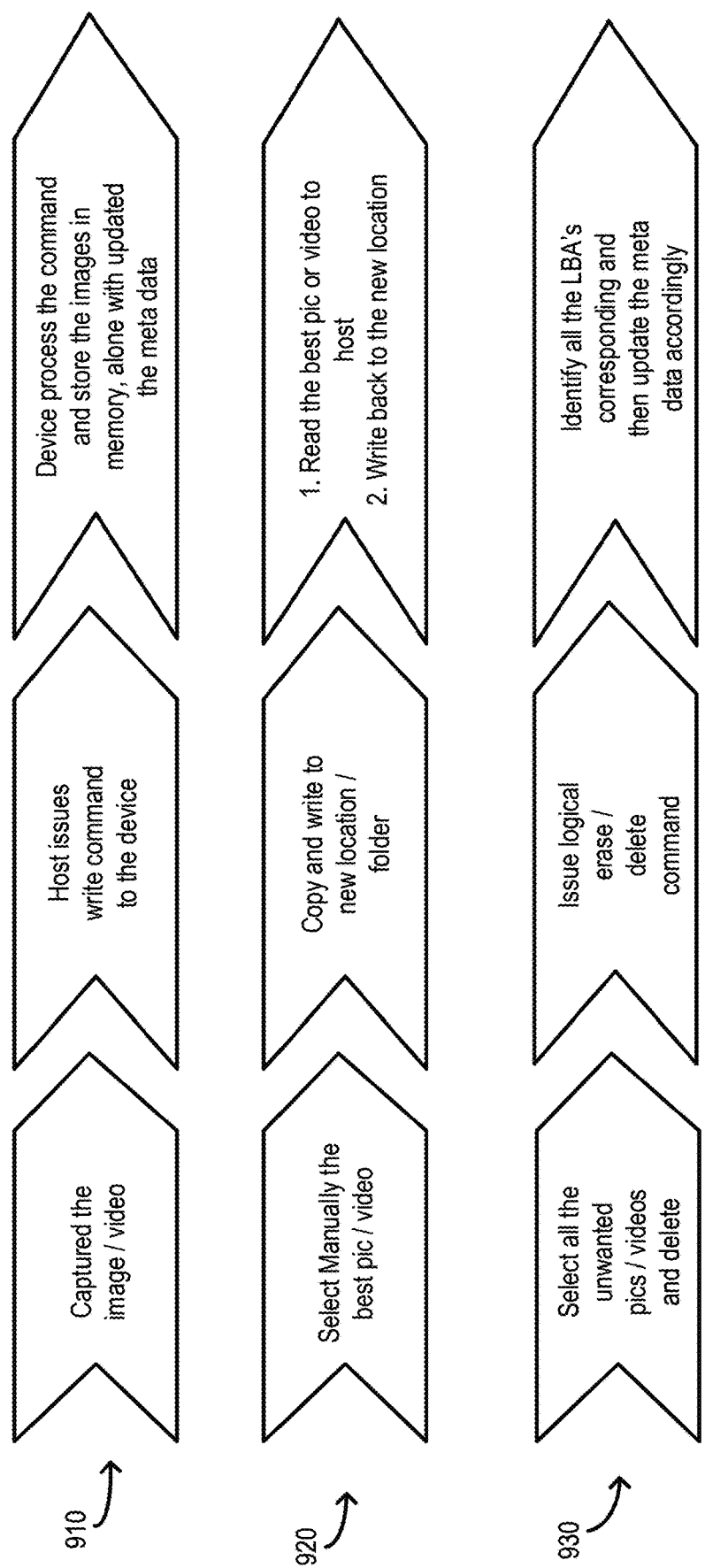
FIG. 9 are flow diagrams of an embodiment.

For example, consider the block budget and corresponding endurance in the SLC and MLC pools in the example of FIG. 9. In step 910, the host 300 captures the image/video, the host 300 issues a write command to the data storage device 100, and the controller 102 of the data storage device 100 processes the command and stores the images in the memory 104 along with update metadata. In step 920, the user manually selects the best picture/video, copies, and writes to a new location/folder, and then reads the best picture/video to the host 300 and writes back to the new location. In step 930, the user selects all the unwanted pictures/videos and selects delete, the host 300 issues a logical erase/delete command, and the controller 102 of the data storage device 100 identifies all the corresponding logical block addresses and then updates the metadata accordingly.

Figure 10:
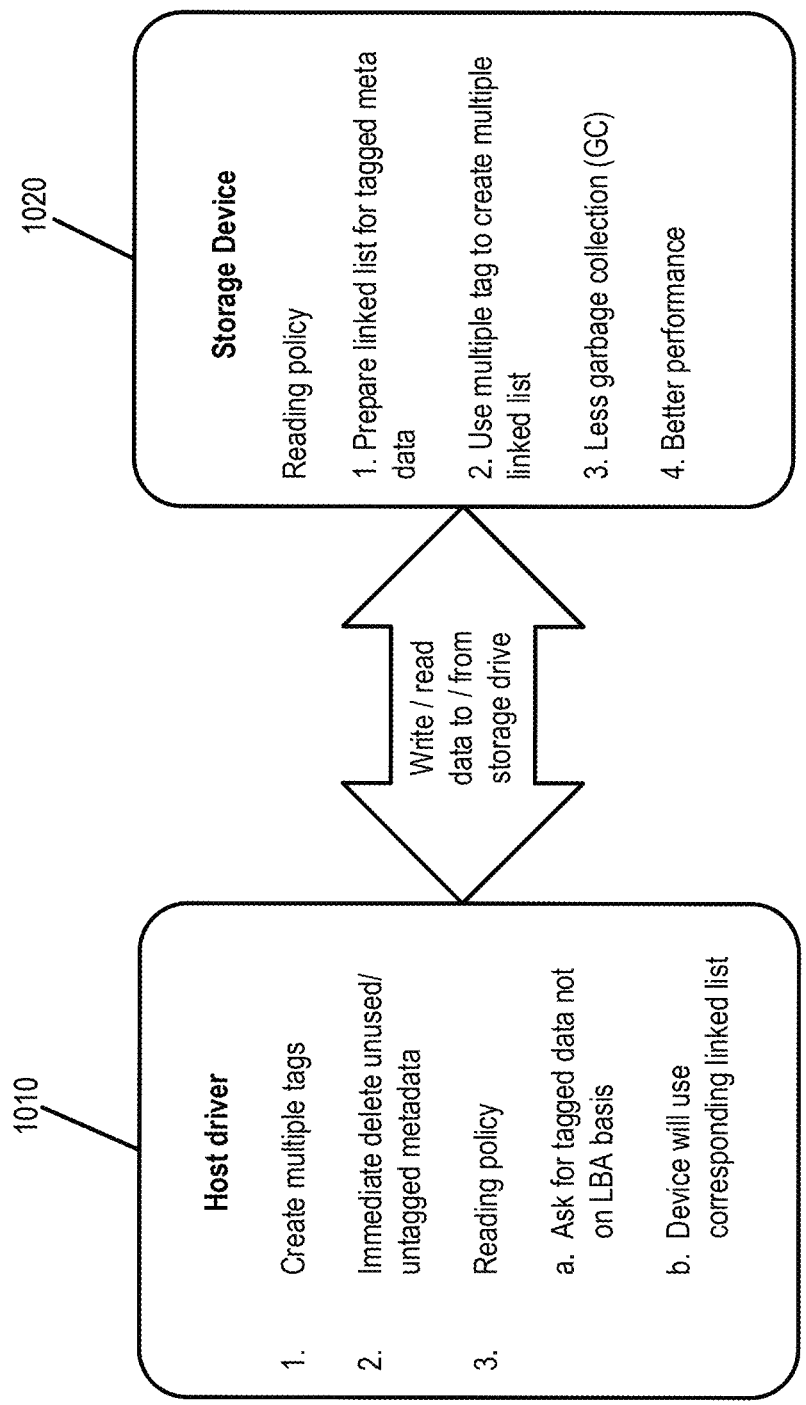
FIG. 10 is an illustration of a host driver and a data storage device of an embodiment.

In one embodiment, a handshake between the host 300 and the data storage device 100 is used that has a tag/linked list for important data, which helps the host 300 sort data faster and reduces garbage collection in the data storage device 100. This can result in lower write amplification and better performance. This process can include building a host cache, writing all data to the data storage device 100, sorting the data, and tagging metadata for important data FIG. 10 illustrates actions taken by a host driver 1010 and data storage device 1020 of an embodiment. To sort/tag the data, the host 300 can take a picture/video and write it to the data storage device 1020, tag the highlighted/important picture/video, and write the tag information (e.g., multiple files and/or videos span across different LBA ranges) via a special command/vendor-specific command. The host read operation for the tagged data can include issuing a vendor-specific command to read the single or multiple files and/or videos. To deleted untagged data, the host can issue a vendor-specific command to delete/trim/defragment the untagged data if not required. In this example, no change is made to the regular read/write operations in the data storage device. However, on receiving a vendor-specific command for a write operation for tagged data, the controller of the data storage device can create a linked list for the LBAs that are involved in the tagged list and write the linked list information in special block. Regarding storage device read operations for the tagged data, on receiving a vendor specific-command, the controller of the data storage device can read corresponding linked list information from a special block, decode the LBAs links into this list, and send all the data to the host in that order. Regarding a storage device delete operation for untagged data, on receiving a vendor-specific command, the controller of the data storage device can read the LBAs linked to the untagged metadata, un-map all the corresponding LBAs from the control block list, and update the valid block count accordingly.

There are several advantages associated with these embodiments. For example, these embodiments can provide effective time utilization which avoids the need for manual intervention for cleaning-up unwanted videos/pictures, reading and stitching videos/pictures, and a back-up process before deleting. As another example, these embodiments can provide effective utilization of memory, as creating a back-up copy provides additional space consumption of memory with respect to write and erase (e.g., by just marking favorites and deleting only the needed ones).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory; and
one or more processors, individually or in combination, configured to:
receive, from a host, a plurality of image frames, wherein a subset of the plurality of image frames have been tagged by the host;
segregate the subset of the plurality of image frames from the plurality of image frames;
create parity protection for the subset of the plurality of image frames, wherein relatively-stronger parity protection is created for the subset of the plurality of image frames than for-nontagged image frames;
store the plurality of image frames in the memory, wherein the subset of the plurality of image frames are stored in blocks of the memory that have a relatively-higher endurance than blocks of the memory that store the non-tagged image frames;
create a data structure that identifies locations in the memory that store the subset of the plurality of image frames;
use the data structure to prioritize garbage collection of the blocks of the memory that store the subset of the plurality of image frames over the blocks of the memory that store the non-tagged image frames;
receive, from the host, a request to perform an operation on the subset of the plurality of image frames;
perform a read look-ahead process to retrieve the subset of the plurality of image frames by:
using the data structure to identify the blocks in the memory that store the subset of the plurality of images; and
retrieving, from the memory, the subset of the plurality of image frames wherein images in the subset of the plurality of image frames are retrieved from the memory prior to receiving, from the host logical block addresses for those images; and
perform the operation on the subset of the plurality of image frames.

2. The data storage device of claim 1, wherein the one or more processors, individually or in combination, are further configured to route the subset of the plurality of image frames to relatively higher-capacity blocks of the memory.

3. The data storage device of claim 1, wherein the one or more processors, individually or in combination, are further configured to store the data structure in a control block in the memory.

4. The data storage device of claim 1, wherein the data structure comprises a linked list.

5. The data storage device of claim 1, wherein the image frames in the subset of the plurality of image frames are tagged with metadata.

6. The data storage device of claim 1, wherein the one or more processors, individually or in combination are further configured to predict invalidation of image frames that have not been tagged by the host.

7. The data storage device of claim 1, wherein the memory comprises a three-dimensional memory.

8. The data storage device of claim 1, wherein the parity protection comprises exclusive-or parity.

9. The data storage device of claim 1, wherein the parity protection comprises error correction code parity.

10. A method comprising:
performing in a data storage device comprising a memory:

receiving, from a host, a plurality of image frames, wherein a subset of the plurality of image frames have been tagged by the host;

segregating the subset of the plurality of image frames from the plurality of image frames;

creating parity protection for the subset of the plurality of image frames, wherein relatively-stronger parity protection is created for the subset of the plurality of image frames than for non-tagged image frames;

storing the plurality of image frames in the memory, wherein the subset of the plurality of image frames are stored in blocks of the memory that have a relatively-higher endurance than blocks of the memory that store the non-tagged image frames;

creating a data structure that identifies locations in the memory that store the subset of the plurality of image frames;

using the data structure to prioritize garbage collection of the blocks of the memo that store the subset of the plurality of image frames over the blocks of the memory that store the non-tagged image frames;

receiving, from the host, a request to perform an operation on the subset of the plurality of image frames;

performing a read look-ahead process to retrieve the subset of the plurality of image frames by:
  using the data structure to identify the blocks in the memory that store the subset of the plurality of images; and
  retrieving, from the memory, the subset of the plurality of image frames, wherein images in the subset of the plurality of image frames are retrieved from the memory prior to receiving from the host logical block addresses for those images; and performing the operation on the subset of the plurality of image frames.

11. The method of claim 10, further comprising routing the subset of the plurality of image frames to relatively higher-capacity blocks of the memory.

12. The method of claim 10, further comprising storing the data structure in a control block in the memory.

13. The method of claim 10, wherein the data structure comprises a linked list.

14. The method of claim 10, wherein the parity protection comprises exclusive-or parity.

15. The method of claim 10, wherein the parity protection comprises error correction code parity.

16. The method of claim 10, wherein the memory comprises a three-dimensional memory.

17. A data storage device comprising:

a memory; and means for:
  receiving from a host, a plurality of image frames, wherein a subset of the plurality of image frames have been tagged by the host;
  segregating the subset of the plurality of image frames from the plurality of image frames;
  creating parity protection for the subset of the plurality of image frames, wherein relatively-stronger party protection is created for the subset of the plurality of image frames than for non-tagged image frames;
  storing the plurality of image frames in the memory, wherein the subset of the plurality of image frames are stored in blocks of the memory that have a relatively-higher endurance than blocks of the memory that store the non-tagged image frames;
  creating a data structure that identifies locations in the memory that store the subset of the plurality of image frames;
  using the data structure to prioritize garbage collection of the blocks of the memory that store the subset of the plurality of image frames over the blocks of the memory that store the non-tagged image frames;
  receiving, from the host, a request to perform an operation on the subset of the plurality of image frames;
  performing a read look-ahead process to retrieve the subset of the plurality of image frames by:
    using the data structure to identify the blocks in the memory that store the subset of the plurality of images; and
    retrieving from the memory, the subset of the plurality of image frames, wherein images in the subset of the plurality of image frames are retrieved from the memory prior to receiving, from the host, logical block addresses for those images; and
  performing the operation on the subset of the plurality of image frames.

* * * * *